United States Patent [19]

Meinz

[11] Patent Number: 5,098,666
[45] Date of Patent: Mar. 24, 1992

[54] DEVICE FOR METERING AT LEAST TWO FLOWABLE REACTION COMPONENTS INTO A MIXING CHAMBER

[76] Inventor: Hans W. Meinz, Kockerellstrasse 19, 5100 Aachen, Fed. Rep. of Germany

[21] Appl. No.: 362,393
[22] PCT Filed: Dec. 1, 1987
[86] PCT No.: PCT/DE87/00563
   § 371 Date: May 30, 1989
   § 102(e) Date: May 30, 1989
[87] PCT Pub. No.: WO88/04225
   PCT Pub. Date: Jun. 16, 1988

[30] Foreign Application Priority Data

Dec. 1, 1986 [DE] Fed. Rep. of Germany ........ 3640980

[51] Int. Cl.$^5$ ................................................ G05D 7/00
[52] U.S. Cl. ..................................... 422/111; 422/110; 422/243; 366/16; 366/19; 366/152; 366/161
[58] Field of Search ............... 422/110, 111, 243, 305; 366/16, 19, 152, 160, 161, 162; 138/30, 31, 46

[56] References Cited

U.S. PATENT DOCUMENTS

4,132,483 1/1979 Slaats et al. .......................... 366/162

Primary Examiner—Robert J. Warden
Assistant Examiner—Laura E. Collins
Attorney, Agent, or Firm—David C. Purdue; John C. Purdue

[57] ABSTRACT

In a device for metering at least two fluid reaction components into a mixing chamber, flexible displacement elements (1, 2; 47, 48, 49, 50) are provided in each container chamber (43, 44, 45, 46) which divide each container chamber (43, 44, 45, 46) into a component chamber (12, 13; 51, 52, 53, 54;) and a hydraulic chamber (16, 17; 55, 56, 57, 58), whereby the flexible displacement element (1, 2; 47, 48, 49, 50) for each component is acted on by a hydraulic flow which can be pre-specified and also regulated during the metering procedure in its magnitude and duration by a control-regulation device (3 or 4).

24 Claims, 3 Drawing Sheets

DEVICE FOR METERING AT LEAST TWO FLOWABLE REACTION COMPONENTS INTO A MIXING CHAMBER

DESCRIPTION

The invention relates to a device for metering at least two fluid reaction components into a mixing chamber with at least one container chamber for each component, with one displacement element in each container chamber, whereby in all the chambers for at least one component the displacement element is flexible which divides the relevant container chamber into a component chamber and a hydraulic chamber and which hermetically seals off the component chamber from the hydraulic chamber, with a feed pipe for each component running from a component reservoir to the component chamber/chambers, and with an outlet pipe for each component running from the component chamber/chambers to the mixing chamber.

A similar device is known from U.S. Pat. No. 4,132,483. This known device consists of one chamber with a bellows for each component, whereby each hydraulic chamber filled with hydraulic fluid is provided with a plunger piston which is sealed off from its surroundings by means of a dynamic seal and whereby the two plunger pistons are mechanically driven by a common, rotatable crossbar.

This known device does not allow freely selectable adjustment of the dosing ratio during the metering process. Although devices with a coupled mechanical drive which allow alteration of the dosing ratio during metering are known, this mechanical adjustment of the dosing ratio is extremely slow and has one great disadvantage. With larger metering chambers and with the high pressure metering of multicomponent systems, the forces which have to be mechanically transmitted are very high, so that the structural outlay increases correspondingly. A further disadvantage lies in the alteration in the position of the individual chambers to one another which does not allow rigid coupling of the chamber casing. However, in the case of high pressure installations, rigid casing of the metering chambers is imperative for technical, economic and also for safety reasons. In addition, the dynamic seal of the plunger pistons, especially in the case of larger diameters and higher pressures, results in substantial friction and an additional risk of leaking. Losses due to leaks, which are unavoidable even with perfect dynamic seals, progressively alter the stroke of the bellows causing their destruction if the leaks are not constantly checked and fed back into the hydraulic chamber by means of a leak feed-back device, so that the volume of fluid contained in the hydraulic chamber remains constant.

The demands of the plastics processing industry for minimisation of production costs and ever higher product quality make the development and application of suitable control, regulation and monitoring systems acutely necessary. In this area, the development of microprocessor technology and suitable data pickup devices has created the essential pre-requisites for precise single stroke piston metering. This type of metering device is described, for example, in European Patent No. 0,003,563, U.S. Pat. No. 3,908,862 and US-AS 4,008,829.

A disadvantage of these singular stroke piston metering devices is that the plunger piston pumps possess dynamic seals which result in progressive wear of the pump and thus lead to uncontrolled leakage and finally to breakdown, especially when abrasive and/or corrosive components are processed. As a result of this, interruptions of the production process and high maintenance inputs are necessary every three to six months in the case of 24 hour operations, depending on the nature of the components.

The task of the present invention consists in designing a device for the metering of at least two fluid reaction components in such a way as to make possible leak-free, abrasion-free and wear-free dosing of highly abrasive and/or corrosive components as well as a precisely preselectable and controllable volumetric hydraulic flow regulation of the individual components.

This task is solved in accordance with the invention by a device of the kind mentioned at the beginning of the application in that in the case of at least one component, the hydraulic chamber/chambers possesses/possess a feed pipe coming from a source of pressure, and an outlet pipe is provided leading from the hydraulic chamber/chambers to a tank and in that a control-regulation device is provided for each component which determines the hydraulic flow which is pre-selectable in size and duration and which drives the displacement element/elements hydraulically.

The device in accordance with the above description feeds two or more reaction components, e.g. polyol and isocyanate for the manufacture of polyurethane, into a mixing chamber in the correct mixing ratio, usually under high pressure and with the lowest possible tolerances, where a chemical reaction ensues. The high-pressure mixing takes place within milliseconds, whereby the metering pressures are up to 250 bar and in isolated cases higher. The quality of the plastic parts produced depends first and foremost on maintaining the exact mixing ratio from beginning to end of the charge fill as well as on efficient mixing with undisturbed beginning and end of the charge fill. In particular, the mass flows must be kept constant during mixing because of the stoichiometrics of the chemical reaction and because of the reproducible mold part weights.

The device in accordance with the invention has either one or two displacement elements for each component, whereby at least one component is dosed with either one or two flexible displacement elements and the other components can be conveyed by rigid displacement elements, e.g. plunger pistons. However, it is expedient to design all displacement elements as flexible displacement elements since in most cases they allow designs with a considerably longer service life than conventional pistons due to their freedom from friction and wear. The operational condition or service life of the device is not restricted by corrosion, abrasion or deposits. In contrast to known devices, the flexible displacement elements proposed in the device in accordance with the invention are not driven with a constant rate of feed, but with a constant volume flow. Thus the flexible displacement elements are not available for regulating the rate of feed which determines the dose flow. Since the stroke-diameter ratio of the flexible displacement elements is small in comparison to plunger pistons, correspondingly large diameters are designed, which is possible because the friction from the piston is not present and which results in very compact metering containers with a diameter-height ratio of approximately 1:1. Thus, because the flexible displacement elements are free from friction, even the smallest dosage volumes can be metered exactly with even the largest metering containers, provided that the electrical control or regulation of the variable hydraulic flow is correspondingly designed. A further advantage of the device in accordance with the invention consists in the fact that at all times only an extremely low differential pressure acts on the flexible displacing elements. This allows e.g. the use of thin-walled flexible displacement elements made of steel or plastic with a low bending resistance and a consequent long service life.

In accordance with a further proposal of the invention, the device can be designed in such a way that an end position sensor is provided for each flexible displacement element, which acts in conjunction with the control-regulation device. During operations with most flexible displacement elements the stroke end positions may under no circumstances be overstepped, otherwise the displacement elements will be destroyed. Determination of the end position can here be undertaken by any of the various electrical sensors on the market, which are usually also available in encapsulated high-pressure resistant versions. These sensors can be designed either for the continual positioning and monitoring of the elastic displacement elements over the entire stroke or simply as mere limit switches. As soon as the relevant electric signal is given by the sensor, the hydraulic flow controlled by the control-regulation system is stopped and/or controlled valves block the hydraulic or component flow thus preventing an undesired increase in the differential pressure between the hydraulic and the component chambers.

In accordance with a further proposal of the invention, the device can be designed in such a way that the end position sensor is an electric contact-free proximity switch. Thus the permissible stroke end positions can be detected in a simple manner and evaluated by means of an electric output signal. However, this arrangement allows only the determination of the two extreme deflections of the flexible displacement elements.

In accordance with a further proposal of the invention, the device can be designed in such a way that the end position sensor is an electric displacement pickup which is connected to the flexible displacement element on the hydraulic chamber side. This design makes possible continual measurement over the entire stroke of the flexible displacement element and can therefore be used not only for determination of position, but also for stroke end shutoff as well as for additional monitoring of the metering operation.

In accordance with a further proposal of the invention, the device can be designed in such a way that the flexible displacement element is a bellows made of metal or plastic.

Bellows are characterised in that they allow a particularly large displacement volume in conjunction with a low internal resistance. Bellows made of austenitic stainless steel are preferable to those made of plastic, particularly in the case of abrasive components. A further advantage of bellows made of steel consists in the fact that they can be welded to the flange as well as to the base, which guarantees optimal sealing between component and hydraulic chambers. It is particularly important for the service life of all bellows that the accelerations of the bellows bases do not exceed a characteristic value for each bellows. For this purpose, it is appropriate to use a ramp former within the framework of the control-regulation system which alters the target value of the hydraulic flow during a set ramp time from zero to the target value set as the end value. During the braking procedure, the target value is altered in the reverse sequence. The switching cycles of the hydraulic and/or component valves should also be adjustable so that the permissible accelerations for each bellows can be selected.

In accordance with a further proposal of the invention, the device can be designed in such a way that the flexible displacement element is a membrane. This design, roughly in the shape of a hemispherical membrane of large volume, is significant for its unrivalled low price in comparison with the aforementioned steel or plastic bellows. The disadvantage of all membranes which can achieve a relatively large displacement volume as a function of their diameter is the limited resistance to chemicals of the elastic rubber membrane materials.

In accordance with a further proposal of the invention, the device can be designed in such a way that the membrane consists of an elastic rubber material coated with PTFE. The PTFE coating of the elastic rubber membrane ensures good chemical resistance to all reaction components encountered in practice. However, a disadvantage is the smaller stroke in relation to the size of the effective diameter of the membrane, which corresponds to an increase in size of the container chamber with an unchanged function.

In accordance with a further proposal of the invention, the device can be designed in such a way that the displacement element in the container chamber/chambers of at least one component is of rigid construction. It may be expedient for economic reasons, in particular in the case of multicomponent systems, to dose the components consisting of an unproblematical, well lubricating fluid with rigid displacement elements such as stroke displacement pistons, and all problematical components with flexible displacement elements, e.g. bellows.

In accordance with a further proposal of the invention, the device can be designed in such a way that the flexible displacement element consists of at least two dividing walls arranged beside one another. A double-walled or multiple-walled design of the flexible displacement element allows greater elasticity and at the same time lower bending resistance, which results in a greater effective displacement volume. A further advantage of the multi-walled flexible displacement element is the greater degree of safety when leaks develop. In general, not all dividing walls of the displacment element will develop leaks simultaneously, but rather the leak will begin at an outer wall so that a leakage warning is possible before the whole flexible displacement element becomes leaky.

In accordance with a further proposal of the invention, the device can be designed in such a way that a film of fluid is present between each of the dividing walls and that the space and/or spaces between the dividing walls are connected with the surroundings outside the container chamber. This design incorporates a simple leakage warning system in that a fluid is introduced between the dividing walls which is compatible with the components and which forms a thin lubricating film between the dividing walls.

The space between the dividing walls is connected with the surroundings outside the container chamber, where a leakage warning device is provided which produces a signal in the case of the rupture of a dividing wall.

In accordance with a further proposal of the invention, the device can be designed in such a way that the control-regulation system is installed in the feed pipe running from the pressure source to the hydraulic chamber with a closed control loop. The constancy of the hydraulic flow to the hydraulic chamber is decisive for the metering quality of the flexible displacement elements, and this can be achieved in accordance with the present proposal by means of a hydraulic flow control with a closed control loop. The problem presented by the single-stroke metering device is the fact that the hydraulic flow control must take place within milliseconds during short metering shots (approximately 1 to 3 seconds) and volume flows of up to around 10 liters per second in the case of high performance metering devices.

In accordance with a further proposal of the invention, the device can be designed in such a way that the control-regulation system is an electro-hydraulic amplifier, whereby the measurement of the actual value of the hydraulic flow is carried out by a flow rate meter which possesses a rotating measuring shaft which is mechanically coupled to a copying control valve connected to an electrical control motor, whereby the rotating pre-specified movement of the control motor (=target value) is reproduced true to the angle of rotation with the aid of the copying control valve in the form of a rotary output movement of the measuring shaft (=actual value), and whereby the absorption current of the flow rate meter (=measured hydraulic flow) is in direct relation to the rotating movement caused by the flow rate meter.

With this embodiment of the invention an electro-hydraulic amplifier is used to measure and regulate the preselectable hydraulic flow, consisting of a flow rate meter, a copying control valve and a control motor, e.g. a stepping motor. The control motor is set to a preselectable rotating movement (=target value), which with the aid of the copying control valve, which corrects any non-synchronous movement between the control system and the flow rate meter by means of a distributing slide valve which reduces the volume flow, is reproduced in a rotating output movement of the flow rate meter (=actual value) in a manner true to the angle of rotation and whereby the absorption current of the flow rate meter (=measured volume flow rate) is in direct relation to the movement caused by the flow rate meter. Thus, the flow rate meter is not only responsible for the continual measurement of the actual value, but also for dynamic correction of the hydro-mechanical control loop integrated in the copying control valve, in that in the case of a discrepancy between target value and actual value the measuring shaft adjusts the actual value to match the target value via a spindle-nut connection by means of mechanical adjustment of the distributing slide valve located in the copying control valve. In contrast to electric actual value pickups, measuring of the actual value, the actual/target value comparison and the adjustment to match the target value occur simultaneously, so that the control oscillation does not occur which is usual with electric control loops and which leads to a momentary excessive or insufficient modulation of the volume flow in the case of fluctations in pressure or load.

In accordance with a further proposal of the invention, the device can be designed in such a way that the flow rate meter is a stroke displacement motor which does not produce any external mechanical output and the output pressure of which, in accordance with the hydromechanical losses, is slightly lower than the input pressure, that the drive unit chamber of the stroke displacement motor is constantly connected to its outlet and that the stroke displacement motor possesses a rotating motor shaft which is designed as a measuring shaft.

The aforementioned flow rate meter is of particular advantage for the hydraulic flow regulation of the device in accordance with the invention because internal leakages are reduced by it to a harmless level. It is appropriate for continual measurement of the through flow rate, whereby large and sudden pressure fluctuations can also be dealt with. Further advantages are an excellent reproducible accuracy of measurement (error of measurement <0.1%), a very large measuring range (approx. 1:1000) as well as a very large pressure range (up to around 1000 bar). As a result of the extremely small pressure differences between input and output of the hydraulic motor, the strain on all of the drive components is very small, which is advantageous for the service life (little friction), in particular at high pressures and speeds. Apart from the technical advantages, this flow rate meter has the great advantage that conventional standard motors only require a modification in order to accommodate it. The essential components can be taken from standard manufacturing programs, so that economic manufacture is possible.

In accordance with a further proposal of the invention, the device can be designed in such a way that the flow rate meter is a hydraulic circulating displacement motor which possesses a rotating motor shaft designed as a measuring shaft. An example of this type of flow rate meter is the rotary-piston meter which is used in the medium pressure range and which is relatively cheap due to its widespread use.

In accordance with a further proposal of the invention, the device can be designed in such a way that the flow rate meter is a hydraulic linear motor which possesses a piston rod which is moved in a translatory manner, connected via a spindle-nut connection to a rotating measuring shaft, which is in turn mechanically coupled to the copying control valve. This type of flow rate meter is advantageous in connection with an electro-hydraulic amplifier particularly for the measurement of small and medium hydraulic flows, whereby the return stroke of the linear motor, unlike the known linear amplifier which is also used for metering purposes, can also be used for the regulation of the hydraulic flow and thus for metering if the rotating measuring shaft is sealed off from the copying control valve by means of shaft packing. In contrast to the known linear amplifier, the device in accordance with the invention does not produce any external mechanical output.

In accordance with a further proposal of the invention, the device can be designed in such a way that the control-regulation unit is a hydraulic secondary control device. Essentially, the hydraulic secondary control device consists of a hydraulic motor with an infinitely variable absorption volume and an attached tacho-alternator with a digital or analog signal display. The hydraulic motor must be equally suitable for motor and pump operation and the stroke volume of the motor must be extremely rapidly adjustable from zero to maximum. The rate of rotation of the hydraulic motor is registered by the tacho-alternator and compared with the target value. The deviation is interpreted by a PID control which alters the absorption volume of the hydraulic motor with its setting signal by means of a servo adjusting cylinder. In a similar manner to the electro-hydraulic amplifier, the absorption current of a hydraulic motor is thus used to regulate the hydraulic flow, whereby the secondary control device has the advantage that it does not require a throttle control, which has a very positive effect on the energy consumption, as conventional metering devices with proportional or servo valve control and/or linear amplifier drive convert up to 50% of the hydraulic energy into heat.

In accordance with a further proposal of the invention, the device can be designed in such a way that the pressure source is a hydraulic pump which acts in conjunction with a control-regulation unit. This embodiment could be used for small and very small volume flows in the low and medium pressure range, whereby the hydraulic pump can be designed either as a constant pump with an adjustable drive motor or as a hydraulic variable displacement pump. In both cases the hydraulic flow can be regulated via a closed control loop, however the exactness required in each case can also be achieved by the inherent constancy of the pump drive, for instance by means of a stepping motor drive.

In accordance with a further proposal of the invention, the device can be designed in such a way that the control regulation system is an electro-hydraulic proportional or servo valve. Unlike the proportional valve, the servo valve is used mainly in electro-hydraulic control loops. The electro-hydraulic control produces small control oscillations which are harmless during stationary operations. However, damaging control oscillations can occur with load fluctuations such as arise according to plan during polyurethane processing. Despite this, this embodiment could still be an economic alternative because of its low price.

In accordance with a further proposal of the invention, the device can be designed in such a way that a volumetric flow rate meter with an electric output signal is provided for the measurement of the actual value of the hydraulic flow. Measurement of the actual value in the hydraulic or component flow is necessary for the regulation of the hydraulic flow by the hydraulic pump or the proportional or servo valve. In the hydraulic flow, this can be a volumetric flow rate meter located in the feed pipe between the source of pressure and the hydraulic chamber which constantly measures the actual value. This is then converted as an electric signal into a value comparable with the target value and then compared with the target value. If there is a discrepancy between the actual and the target value, the difference is converted into a signal which influences the servo valve in such a way that the actual value is matched to the target value. In order to ensure that the adjustment is rapid, as many measured values per unit of time as possible must be determined and processed.

In accordance with a further proposal of the invention, the device can be designed in such a way that a mass flow rate meter with an electric output signal is provided between each component chamber or between the component chambers and the mixing chamber for the regulation of the hydraulic flow, whereby the mass flow rate meter measures the mass flow of the various components, and that the electric output signal serves as the actual value for the regulation of the hydraulic flow. Determination of the actual value in the component flow, as is here proposed, is as a rule always the most accurate method. It has always failed in the past with the known devices because the known flow rate meters were either too prone to interference or too inexact. Today, electronic mass flow rate meters are available on the market which operate without moving parts and which offer excellently reproducible measuring precision. The disadvantage of lengthy measuring times remains, so that regulation using these meters is only appropriate in the case of continual flow systems without any significant load fluctuations.

In accordance with a further proposal of the invention, the device can be designed in such a way that for each component a mass flow rate meter with an electric output signal is provided between the component chamber/chambers and the mixing chamber in each case, which measures the mass flow of the respective components and corrects the pre-selected target value of the hydraulic control correspondingly. This embodiment is a combination of exact mass flow measurement in the component flow and rapid regulation in the hydraulic flow. If an electro-hydraulic amplifier with a flow rate meter designed as a stroke displacement motor is installed in the hydraulic flow between the source of pressure and the hydraulic chamber in accordance with the above proposal, all dynamic disturbance variables such as pressure fluctuations will be corrected by the electro-hydraulic amplifier and all quasi-static disturbance variables such as density fluctuations will be corrected by the mass flow rate meter.

In accordance with a further proposal of the invention, the device can be designed in such a way that for each component a displacement element is provided which can apply the necessary dosage within a metering stroke. Similar to the single stroke piston dosers, this type of device doses the required amount of a reaction component within a single stroke for the purpose of molded part manufacture. Often, the size of the container chamber is geared to the size of the mold part because it is possible to choose the optimal process data combination for the quality of a molded part if the metering device is specialised for one molded part. The reproducibility of all data from charge to charge is also facilitated by this combination. Using bellows of stainless steel, charge volumes of a maximum of around 50 liters per component can be achieved. The fact that low cost hydraulic aggregates can be provided with the aid of hydraulic storage facilities which make the hydraulic energy available for metering is a further advantage.

In accordance with a further proposal of the invention, the device can be designed in such a way that for each component two displacement elements are provided which perform the metering and filling stroke alternately, that the stroke speed for filling is higher than that for metering and that for a brief moment at the stroke end positions both displacement elements dose simultaneously. This embodiment allows continuous metering and/or increased throughput with smaller metering units. For example, in the case of a two component metering device, metering can be performed in a pulsation-free manner with any volume of charge, dependent only on the capacity of the hydraulic storage facility, with four bellows and two hydraulic flow regulators. In addition, a more rapid sequence of charging without any idle time for the filling stroke is possible. Due to the lack of start-up friction of the bellows practically no pressure fluctuations result during switching of the displacement elements of a component. This metering concept offers the greatest possible level of universality for a two or multi-component metering device.

In the following part of the description, the device in accordance with the invention is illustrated diagrammatically in two practical embodiments and described in more detail below.

Figure 1:
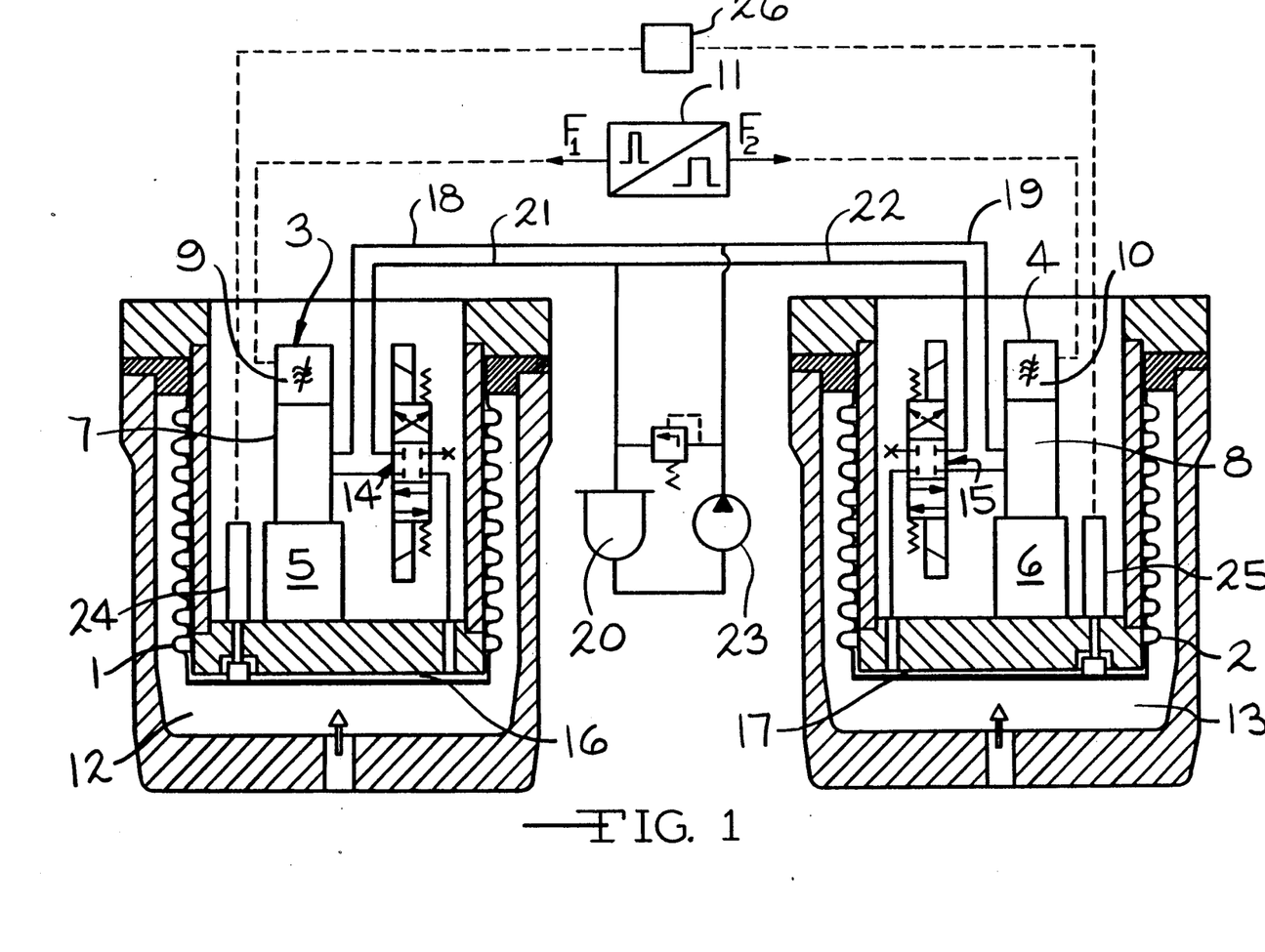
FIG. 1 shows a device with an electro-hydraulic amplifier for discontinuous metering of two components.

FIG. 1 shows a practical embodiment of the invention for dicontinuous metering of two components with two welded bellows 1, 2 of stainless steel, with two electro-hydraulic amplifiers 3, 4 which consist of one hydraulic stroke displacement motor 5, 6 each, one copying control valve 7, 8 each, and one stepping motor 9, 10 each. By means of a pulse counter (not illustrated) integrated in the control frequency generator 11, the volume rate of flow of the hydraulic flow (=dose amount of the reaction components) can be set with a high degree of accuracy before the metering stroke. The desired volumetric dose ratio of the two reaction components each located in one component chamber 12, 13 is digitally set in the control frequency generator 11 by two pre-selected control frequencies F1 and F2. These two frequencies are allotted via amplifiers (not illustrated) to two stepping motors 9, 10 which convert them in a manner free from slipping into one singly measured and regulated hydraulic flow each via two copying control valves 7, 8 and two hydraulic motors 5, 6. After the metering stroke is completed, both stepping motors 9, 10 and the hydraulic motors coupled to them 5, 6 are stopped. Simultaneously, two 4/3 way valves 14, 15 switch via their zero setting to their return stroke setting. This means that the feed pipes 18, 19 leading to one hydraulic chamber 16, 17 respectively are closed and the discharge pipes 21, 22 leading from the hydraulic chambers 16, 17 to a tank 20 are opened. As a result, the reaction components, which are located in the component chambers 12, 13 respectively, force the bellows 1, 2 under inlet pressure back to their starting position, whereby the hydraulic fluid in one of the hydraulic chambers 16, 17 respectively flows back into the tank 20 belonging to a pressure source 23 via the two 4/3 way valves 14, 15. A stroke end switch-off is necessary to prevent the bellows 1, 2 from running out over the admissible stroke length. This is achieved here with two displacement pickups 24, 25. In addition, the two displacement pickups 24, 25 perform additional monitoring of the metering device. An electronic evaluator 26 constantly compares the values provided by the two displacement pickups 24, 25 with the pre-selected number of impulses from the control frequency generator 11 and switches the device off due to the presence of a technical fault when a defined differential value is exceeded.

Figure 2:
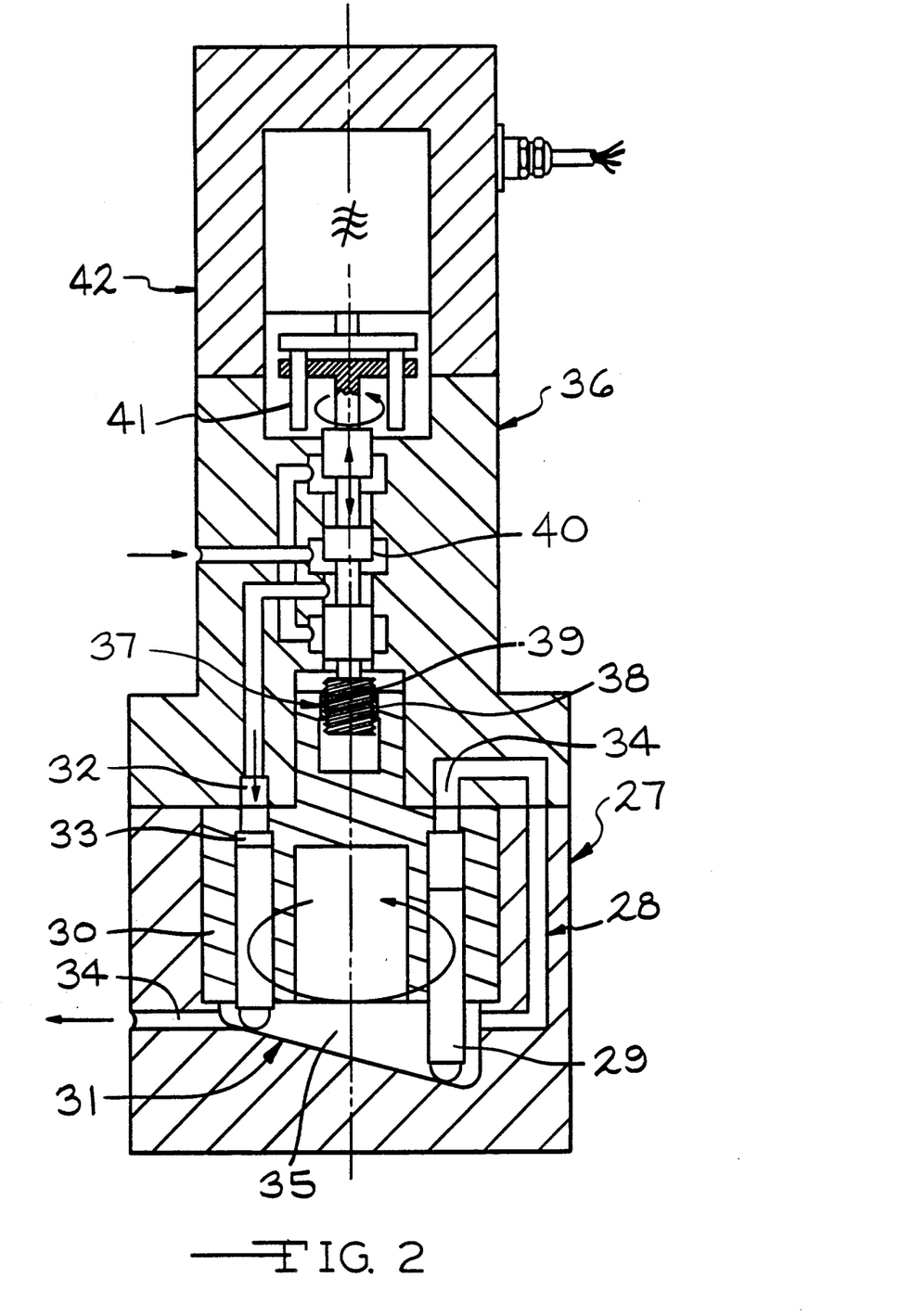
FIG. 2 shows an electro-hydraulic amplifier in accordance with FIG. 1 with an axial piston motor in detail.

FIG. 2 shows the electro-hydraulic amplifier represented in FIG. 1 with an axial piston motor 27 encased in a pressure resistant casing 28. In order to ensure a hydraulic flow as free from pulsations as possible at least nine pistons 29 are necessary which run in a cylinder drum 30. The pistons 29 are supported on the slanting surface 31 mounted in the casing 28. The forces of all of the cylinder chambers 33 connected to the inlet 32 which act vertically to the axis of the pistons 29 produce a torque on the cylinder drum 30 which is always just as large as the torque caused by the hydromechanical losses. The power loss resulting from the loss torque is converted into heat in the axial piston motor 27. Consequently, provision must be made for adequate heat removal with the hydraulic fluid, which is fulfilled in that the outlet 34 of the axial piston motor 27 runs through the drive unit chamber 35 to the outside. The axial piston motor 27 is connected in a sealed manner with a copying control valve 36, whereby a measuring shaft 37 is designed as a spindle nut 38 which acts in conjunction with a spindle 39. The spindle 39 is firmly connected to the control gate valve 40 of the copying control valve 36 as well as to a stepping motor 42 over an axial compensating coupling 41. If a pre-set rate of rotation corresponding to a defined hydraulic flow is applied by the stepping motor 42, the spindle 39 is screwed out of the spindle nut 38 when the stepping motor 42 starts up and this causes an axial displacement of the control gate valve 40, which then opens the inlet 32 to the axial piston motor 27. The hydraulic flow thus released drives the axial piston motor 27 for as long as is necessary until the rate of rotation of the axial piston motor 27 equals the rate of rotation of the stepping motor 42. If the rate of rotation of the axial piston motor 27 exceeds the pre-selected rate of rotation of the stepping motor 42, the control gate valve 40 of the copying control valve 36 is screwed back into the middle position and thus blocks the inlet 32 to the cylinder chambers 33 for as long as is necessary until the stepping motor 42 and the cylinder drum 30 again rotate at the same rate. Thus, the magnitude of the hydraulic flow entering at the inlet 32 can be exactly measured and controlled by means of a pre-selected rate of rotation of the stepping motor 42 which corresponds to a defined hydraulic flow.

Figure 3:
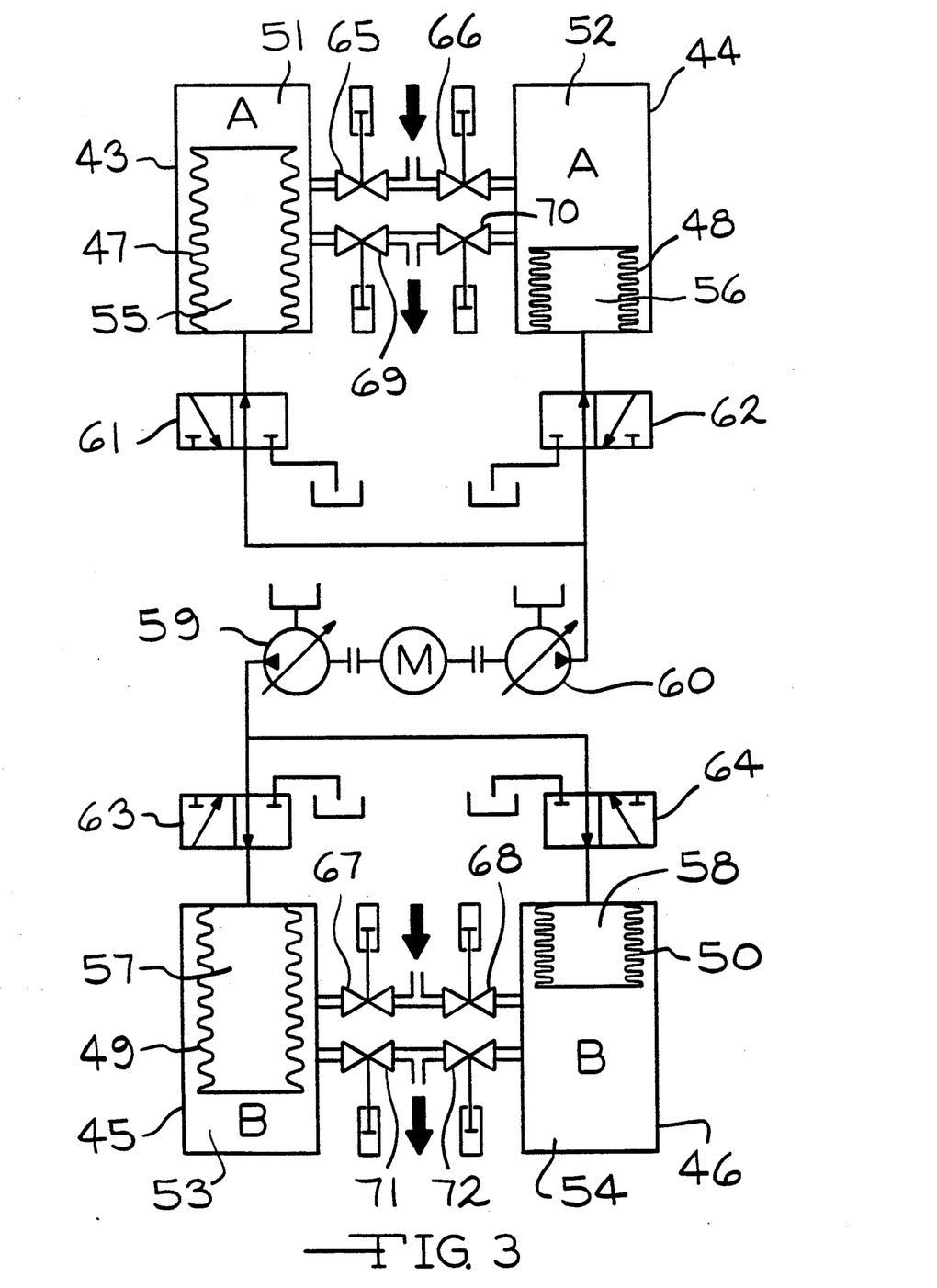
FIG. 3 shows a device with a hydraulic pump which can be regulated for continuous metering of two components.

FIG. 3 shows a further embodiment of the invention in which the device is designed with a hydraulic pump which can be regulated for the continuous metering of two components by means of bellows metering. The device shown consists essentially of four individually arranged container chambers 43, 44, 45, 46 with bellows 47, 48, 49, 50 located in them which divide each of the container chambers 43, 44, 45, 46 into a component chamber 51, 52, 53, 54 and a hydraulic chamber 55, 56, 57, 58. The bellows 47, 48, 49, 50 are individually driven hydraulically by two variable pumps 59, 60, whereby the dosing ratio can be pre-set in a known manner. In addition, between the hydraulic chambers 55, 56, 57, 58 and the corresponding variable pumps 59, 60 there is in each case a 3/3 way directional control valve 61, 62, 63, 64, which is switched on or off by a central control unit (not illustrated). In addition, the device in accordance with the invention possesses a component storage container actuated by compressed gas (not illustrated) for each component, which is connected with the component chambers 51, 52 or 53, 54 via a force-controlled shutoff valve 65, 66 or 67, 68 respectively, as well as a mixing chamber (not illustrated) which is likewise connected with the component chambers 51, 52 or 53, 54 via a force-controlled shutoff valve 69, 70 or 71, 72 respectively.

The metering stroke of the first pair of container chambers 43, 45 is performed simultaneously with the filling stroke of the second pair of cylinders 44, 46. Due to a higher stroke speed for filling than for metering, simultaneous metering of both container chambers 43, 44 or 45, 46 of a component is possible in the end positions which permits completely pulsation-free, continuous metering. In this practical embodiment the size of the bellows 47, 48, 49, 50 is essentially determined by the required discharge capacity and by the switching time and permitted switching frequency of the force-controlled shutoff valves 65, 66, 67, 68 and 69, 70, 71, 72 respectively.

I claim:

1. A device for metering at least two fluid reaction components, said device comprising
   a mixing chamber,
   at least one container chamber for each component,
   a displacement element in each container chamber wherein, in all the container chambers of at least one component, the displacement element is a flexible element which divides the relevant container chamber into
      a component chamber (12 or 13; 51, 52 or 53, 54) for receiving and discharging a fluid reaction component and
      a hydraulic chamber, said flexible element being connected to the container chamber so that it hermetically seals the component chamber from the hydraulic chamber,
   a feed pipe for each component,
   a component storage container for each component, each of said component storage containers being connected by said feed pipes to the corresponding component chamber/chambers,
   an outlet pipe for each component, said outlet pipe connecting said component chamber/chambers to the mixing chamber, wherein the hydraulic chamber (16 or 17) or chambers (55, 56 or 57, 58) for at least one fluid reaction component is connected to a hydraulic circuit comprising
      a hydraulic chamber feed pipe (18 or 19) connected to one of said hydraulic chambers,
      a pressure source (23; 59 or 60) for delivering hydraulic fluid, under pressure, to said hydraulic chamber feed pipe,
      a hydraulic chamber outlet, (21 or 22)
      a tank (20) connected to receive hydraulic fluid from said hydraulic chamber outlet and
      a control-regulation system (3 or 4) connected in the hydraulic circuit to receive hydraulic fluid under pressure from said pressure source, wherein said control-regulation system is operable, for each component to determine a hydraulic flow which is preadjustable in its magnitude and duration, and wherein the controlled hydraulic flow is operable to hydraulically drive the displacement element (1 or 2)/elements (47, 48 or 49, 50).

2. A device in accordance with claim 1, which further comprises an end position sensor (24, 25) connected to each flexible displacement element and the hydraulic circuit so that the sensor is operable to selectively disable the flow of hydraulic fluid when that is desired.

3. A device in accordance with claim 2 wherein the end position sensor (24, 25) is an electric contact-free proximity switch.

4. A device in accordance with claim 2 wherein the end position sensor (24, 25) is an electric displacement pickup which is connected to the flexible displacement element (1, 2; 47, 48, 49, 50) on the side of the hydraulic chamber.

5. A device in accordance with one of the claims 1-4 wherein the flexible displacement element (1, 2: 47, 48, 49, 50) is bellows made of metal or plastic.

6. A device in accordance with one of the claims 1-4 wherein the flexible displacement element is a membrane.

7. A device in accordance with claim 6 wherein the membrane consists of a PTFE-coated rubber elastic material.

8. A device in accordance with one of the claims 1-4 wherein the displacement element in the container chamber/chambers (43, 44 or 45, 46) of at least one component is of a rigid design and does not include a flexible displacement element.

9. A device in accordance with one of the claims 1-4 wherein the flexible displacement element consists of at least two dividing walls beside one another and defining a space therebetween.

10. A device in accordance with claim 9 wherein a film of fluid is present between each of the dividing walls and wherein the space or spaces between the dividing walls are connected to a leakage warning device outside of the container chamber (43, 44, 45, 46).

11. A device in accordance with one of the claims 1-4 wherein the control-regulation system (3, 4) is installed in the feed pipe (18, 19) running from the pressure source (23; 59, 60) to the hydraulic chamber (16, 17; 55, 56, 57, 58) with a closed control loop.

12. A device in accordance with claim 11 wherein the control-regulation system (3, 4) is an electro-hydraulic amplifier, whereby measurement of the actual value of the hydraulic flow is carried out by a flow rate meter (5, 6; 27) with a rotating measuring shaft (37) which is mechanically coupled to a copying control valve (36) which is in turn connected to an electric control motor (42), whereby the rotating pre-specified movement of the control motor (42) (=target value) is copied in a manner true to the angle of rotation with the help of the copying control valve (36) to produce a rotating output movement of the measuring shaft (37) (=actual value) and whereby the absorption current of the flow rate meter (5,6; 27) (=measured hydraulic flow) is in direct relation to the rotation produced by the flow rate meter (5, 6; 27).

13. A device in accordance with claim 12 wherein the flow rate meter (5, 6; 27) is a hydraulic circulating displacement motor which possesses a rotatable motor shaft which is designed as a measuring shaft (37) that rotates, when operating, at a rate which reflects the flow rate of hydraulic fluid therethrough.

14. A device in accordance with claim 12 wherein the flow rate meter (5, 6; 27) is a hydraulic linear motor with a piston rod moved in a translatory manner which is connected to a rotating measuring shaft (37) which is mechanically coupled with the copying control valve (36).

15. A device in accordance with claim 11 wherein the control-regulation system (3, 4) includes a hydraulic secondary regulation system comprising a hydraulic motor with a variable stroke volume, a tacho-alternator for measuring the flow of fluid through the motor, and control means for detecting deviations between the measured flow of hydraulic fluid with a desired flow of hydraulic fluid, and for changing the stroke volume to eliminate deviations between the desired hydraulic flow rate and the measured hydraulic flow rate.

16. A device in accordance with claim 1 wherein the source of pressure (23; 59, 60) is a hydraulic pump which is controlled by the control-regulation system.

17. A device in accordance with claim 11 wherein the control-regulation system (3, 4) is an electro-hydraulic proportional or servo valve.

18. A device in accordance with claim 16 which further comprises a volumetric flow rate meter (5, 6; 27) with an electric output signal, wherein the volumetric flow rate meter (5, 6; 27) is operable to measure the hydraulic flow through the flow rate meter.

19. A device in accordance with claim 16 wherein the control-regulation system further comprises a mass flow rate meter with an electric output signal for the regulation of the hydraulic flow between the component chamber (12 or 13)/chambers (51, 52 or 53, 54) and the mixing chamber respectively, wherein the meter is operable to measure the mass flow of the respective components, and wherein the electric output signal serves as the actual value for the regulation of the hydraulic flow.

20. A device in accordance with claim 12 which further comprises a mass flow rate meter with an electric output signal for each component between the component chamber (12 or 13)/chambers (51, 52 or 53, 54) and the mixing chamber, wherein the meter is operable to measure the mass flow of the relevant component and correspondingly correct the pre-selected target value of the hydraulic flow control.

21. A device in accordance with claim 1 for metering up to a given volume of a component, wherein a displacement element (1 or 2) is provided for each component, and wherein the displacement elements are sized so that they can discharge the given volume in a single metering stroke of said displacement element.

22. A device in accordance with claim 1 which comprises first and second container chambers for each component, and first and second displacement elements in said container chambers defining first and second pairs of component chambers and hydraulic chambers and, wherein, the control regulation system is operable to alternately supply a controlled hydraulic fluid flow to the first and second hydraulic chambers so that when the first component chamber is being filled with a component, the second component chamber is discharging a component and vice versa, and, wherein, the flow of hydraulic fluid to the hydraulic chambers is controlled so that a component in a component chamber is discharged at a slower rate than a component is charged to a component chamber and, wherein, during a cycle of operation, the first and second component chambers are discharging a component at the same time for a brief moment.

23. A device for metering at least two fluid reaction components into a mixing chamber, said device comprising
at least one container chamber for each component,
a displacement element provided in each container chamber, said displacement element being connected inside said container chambers so as to divide the interior of said container chamber into a component chamber and a hydraulic chamber and to hermetically seal the component chamber from the hydraulic chamber, wherein the displacement element in all of the container chambers for at least one component constituting a flexible displacement element which divides the container chamber into a component chamber and a hydraulic chamber and hermetically seals one from the other,
a component inlet including a feed pipe provided in each component chamber,
a component outlet including a discharge pipe provided in each component chamber, said discharge pipes serving said mixing chamber,
hydraulic supply means for supplying hydraulic fluid under pressure to all of said hydraulic chambers for at least one of the components,
hydraulic return means including a tank for collecting hydraulic fluid after it has been supplied to said hydraulic chambers,
a source for pressurized hydraulic fluid, and
a control-regulation system for each component which determines a hydraulic flow which is preadjustable in its magnitude and duration and which hydraulically drives the displacement element to alternately charge and discharge components into and out of the component chambers.

24. A device according to claim 12 wherein the hydraulic control circuit further comprises a hydraulic motor of the stroke displacement type which, in turn, comprises a hydraulic fluid inlet, a rotatable shaft wherein the rate at which the hydraulic motor shaft is rotated reflects the rate of flow of a fluid through the hydraulic motor, said hydraulic motor having a drive unit chamber which has an outlet, said drive unit chamber being constantly connected to discharge fluid from its outlet, valve means for controlling the rate of flow of a fluid through the system, an electric control motor, a rotatable shaft, means for rotating the shaft at a controlled rate which reflects a desired rate of flow of hydraulic fluid through the hydraulic motor, and dynamic coupling means for connecting said hydraulic motor rotatable shaft, said electric motor rotatable shaft and said valve means so that, when there is a difference between the desired rate of fluid flow through the system and the actual rate of fluid flow through the system, the valve means are modulated to eliminate the difference.

* * * * *

UNITED STATES PATENT AND TRADEMARK OFFICE
CERTIFICATE OF CORRECTION

PATENT NO. : 5,098,666

DATED : March 24, 1992

INVENTOR(S) : Hans W. Meinz

It is certified that error appears in the above-identified patent and that said Letters Patent is hereby corrected as shown below:

column 12, line 65 should read measured flow of hydraulic fluid and a desired flow of --.

Signed and Sealed this

First Day of June, 1993

Attest:

MICHAEL K. KIRK

Attesting Officer

Acting Commissioner of Patents and Trademarks